Patented Apr. 15, 1930

1,754,727

UNITED STATES PATENT OFFICE

HENRY B. SWAAB, OF PHILADELPHIA, PENNSYLVANIA

SEALING COMPOUND

No Drawing. Application filed May 16, 1929. Serial No. 363,719.

This invention relates to improvements in plastic compositions such as are used in the sealing of gasket, pipe and various other joints.

Heretofore and prior to this invention considerable difficulty has been experienced not only in protecting the joints against oxidation and corrosion but also in obtaining an adequate seal where the joints were subjected to variations in heat and pressure. Another serious objection to certain of the sealing pastes now generally employed is that after they have been applied to the joints to be sealed the material thereof becomes hard and brittle in consequence of which the seal becomes broken or destroyed by the expansion and contraction of the joints. On the other hand some sealing pastes are so soft and of such character that the application of heat thereto causes the material thereof to flow out of the joint with the result that the seal is destroyed.

It is accordingly among the objects of the present invention to overcome the aforementioned objections by providing a sealing composition or paste which is characterized in that it is resilient and pliable to a high degree and yet is not so soft that its sealing efficiency is impaired.

A further object of the invention is to provide a sealing paste which is of uniform texture and even consistency, throughout, which is readily applied to the joint to be sealed, and which is not impaired in sealing efficiency and does not become brittle when subjected to the influence of heat or fire.

A still further object of the invention is to provide a sealing compound which may be readily squeezed into the parts of the joint to be sealed and which is inherently expansible to form a liquid and gas tight seal, the compound being unaffected by and impervious to the passage therethrough of liquid or gas.

Still another object of the invention is the provision of a sealing paste or composition having sufficient body and pliability as to render the same capable for use in place of a gasket.

Other objects of and advantages resulting from the present invention will appear more fully hereinafter.

The aforesaid objects are attained by the use of a sealing paste or composition which preferably comprises a body material consisting of a mixture of ground or shredded asbestos, an adhesive substance such as molasses, glucose, or other saccharine material forming a binder for the asbestos, and water in sufficient quantity to form a paste of the required consistency.

Asbestos, either in ground or shredded form, is employed as the body of the present paste not only because of its heat resisting and fire-proof qualities but also because of its inherent resiliency. The adhesive binder of molasses or the like is employed because of the fact that it expands under heat together with the asbestos base and furthermore carbonizes to form a firm mixture which effectively seals all of the irregularities in the joint.

In preparing the sealing compound of the present invention the asbestos and molasses are thoroughly mixed together until the resultant compound is of an even and smooth consistency, sufficient water being added thereto during the boiling process to thin the molasses as may be desired. The use of approximately 25 pounds of asbestos to 10 gallons of molasses makes a desirable mixture, it being understood, however, that the proportion of asbestos to molasses may be varied within reasonable limits, depending upon the consistency of the molasses without departing from the spirit or principles of the invention. In order to prevent fermentation of the molasses due to its exposure to atmospheric temperature and while the compound is in storage, a suitable preservative, such as formalin or sodium bisulfite, is preferably added to the mixture.

The resultant sealing compound, when properly processed, takes the form of an adhesive, plastic mass which may be readily applied to the parts to be sealed by a paddle or putty knife. The asbestos base of the compound not only provides a compressible, resilient cushion between the parts to be sealed, but also prevents the compound from becoming so hard and brittle as would cause its disintegration upon the application of heat thereto. Not only does this composition adhere without cracking to the surface to which it is applied, but it is also light, fireproof and impervious to and unaffected by liquids and gases.

While the present sealing paste or composition has been described as being especially applicable to the packing of gasket joints and pipe joints, it will be readily understood that it is equally applicable for uses other than those specified. It is accordingly intended to claim the invention broadly as well as specifically as indicated by the appended claims.

What is claimed as new and useful is:—

1. A composition for sealing joints comprising a body material consisting of asbestos, molasses and water.

2. A composition for sealing joints comprising a body material consisting of a resilient, fibrous and non-combustible material, molasses as the binder for said material and water.

3. A composition for sealing joints comprising a body material of ground or shredded asbestos and a saccharide binder for said asbestos.

4. A composition for sealing joints comprising a body material consisting of a mineral fibrous material, a saccharide binder for said material, and a preservative for said binder.

5. A composition for sealing joints comprising a body material consisting of asbestos, molasses and a preservative.

In testimony whereof, I have hereunto affixed my signature.

HENRY B. SWAAB.